(12) United States Patent
Schnieders

(10) Patent No.: US 11,991,724 B2
(45) Date of Patent: May 21, 2024

(54) REAL TIME ADAPTION OF A LATENCY CRITICAL APPLICATION HOSTED BY AN END USER DEVICE

(71) Applicant: Deutsche Telekom AG, Bonn (DE)

(72) Inventor: Dominik Schnieders, Aachen (DE)

(73) Assignee: DEUTSCHE TELEKOM AG, Bonn (DE)

( * ) Notice: Subject to any disclaimer, the term of this patent is extended or adjusted under 35 U.S.C. 154(b) by 225 days.

(21) Appl. No.: 17/429,967

(22) PCT Filed: Feb. 13, 2020

(86) PCT No.: PCT/EP2020/053724
§ 371 (c)(1),
(2) Date: Aug. 11, 2021

(87) PCT Pub. No.: WO2020/165324
PCT Pub. Date: Aug. 20, 2020

(65) Prior Publication Data
US 2022/0132492 A1 Apr. 28, 2022

(30) Foreign Application Priority Data
Feb. 13, 2019 (EP) ...................................... 19156937

(51) Int. Cl.
*H04W 72/51* (2023.01)
*H04W 24/08* (2009.01)
(Continued)

(52) U.S. Cl.
CPC ............ *H04W 72/51* (2023.01); *H04W 24/08* (2013.01); *H04W 28/24* (2013.01); *H04W 72/53* (2023.01); *H04W 72/543* (2023.01)

(58) Field of Classification Search
CPC ..... H04W 72/51; H04W 24/08; H04W 28/24; H04W 72/53; H04W 72/543
See application file for complete search history.

(56) References Cited

U.S. PATENT DOCUMENTS

2016/0007399 A1* 1/2016 Lim ...................... H04W 80/00
370/329
2017/0064706 A1* 3/2017 Patel ..................... H04L 1/1896
(Continued)

FOREIGN PATENT DOCUMENTS

WO WO 2017216510 A1 12/2017

OTHER PUBLICATIONS

Anonymous, "Use Case of Edge Computing and Radio Network Exposure", 3GPP TSG RAN WG3, Oct. 8-12, 2018, 3GPP Draft R3-186040, No. 10, 3$^{rd}$ Generation Partnership Project, Sophia-Antipolis, France, XP051529305.

*Primary Examiner* — Peter P Chau
(74) *Attorney, Agent, or Firm* — LEYDIG, VOIT & MAYER, LTD.

(57) ABSTRACT

A method includes: a) provisioning, at an end user device which is located in a cell of a wireless network, at least one latency critical application and a service layer radio application (SLRA) for communication with a scheduler associated with a base station of the wireless network, the base station serving the cell; b) transferring transmission specific data in real time between the at least one latency critical application and the scheduler via the SLRA, wherein the SLRA is implemented on both the end user device and the scheduler; and c) optimizing allocation of resources in the cell by taking into account current status and operation requirements of the at least one latency critical application and/or optimizing current use of the resources in the cell by using the transmission specific data for adapting the at least one latency critical application in real time to current conditions on the cell.

15 Claims, 2 Drawing Sheets

(51) Int. Cl.
*H04W 28/24* (2009.01)
*H04W 72/53* (2023.01)
*H04W 72/543* (2023.01)

(56) References Cited

U.S. PATENT DOCUMENTS

| | | | |
|---|---|---|---|
| 2017/0353849 A1* | 12/2017 | Lim | H04W 60/04 |
| 2018/0026896 A1 | 1/2018 | Szilagyi et al. | |
| 2019/0239095 A1* | 8/2019 | Ouyang | G06N 3/04 |
| 2020/0213896 A1* | 7/2020 | Faheem | H04W 24/10 |

* cited by examiner

REAL TIME ADAPTION OF A LATENCY CRITICAL APPLICATION HOSTED BY AN END USER DEVICE

CROSS-REFERENCE TO PRIOR APPLICATIONS

This application is a U.S. National Phase application under 35 U.S.C. § 371 of International Application No. PCT/EP2020/053724, filed on Feb. 13, 2020, and claims benefit to European Patent Application No. EP 19156937.5, filed on Feb. 13, 2019. The International Application was published in English on Aug. 20, 2020 as WO 2020/165324 A1 under PCT Article 21(2).

FIELD

The disclosure relates to computer networks, particularly to wireless networks, particularly to mobile networks and, more specifically, to latency critical applications provided within those networks.

BACKGROUND

A network services exchange provider may employ a communication facility, such as a data center, in which multiple customers of the provider locate network, server, and storage gear and interconnect to a variety of telecommunications and other network service provider(s). Data centers may be shared by the multiple tenants having their networking equipment located within the data centers.

With Information Technology (IT) and communications facilities in safe, secure hands, telecommunications, Internet, application service providers, cloud service providers, content providers, and other providers, as well as enterprises, enjoy less latency and the freedom to focus on their core business. Additionally, customers may reduce their traffic back-haul costs and free up their internal networks for other uses.

However, there are some scenarios being realized by server based latency critical applications which require data processing near a respective end user.

Autonomous vehicles, for example, will generate a lot of data. Much of this data will be unstructured and will need to be run through powerful analytics programs to produce actionable data with any value to businesses. Edge computing architectures will help to prioritize what data needs to remain on the edge to be processed by the vehicle's onboard computing power or by any computing device nearby the vehicle and what data should be relayed back to data centers for analysis.

In an autonomous vehicle, even a few milliseconds of delay can result in an accident and catastrophic loss of life. The stakes are simply too high to allow the vehicles' networks to be plagued by lag. Self-driving cars need to react immediately to changing road conditions; they can't simply come to a stop while waiting for instructions or recommendations from a distant cloud server analyzing data.

There are some scenarios where it is useful to locate applications directly on terminals, i.e. user equipment (UE) and, thus, to acquire a reduced latency with respect to roundtrip-time (RTT). Such applications are also called client-based application (client=end user device) in contrast to server-based applications.

However, it is still quite difficult or even impossible to provide latency critical applications via a wireless interface, i.e. a radio interface, as currently used schedulers operate according to a best effort and fair schedule approach when allocating the available resources on the wireless interface, which leads to an unacceptable variance in latency and jitter for any latency critical application.

SUMMARY

In an exemplary embodiment, the present invention provides a method. The method includes: a) provisioning, at an end user device which is located in a cell of a wireless network, at least one latency critical application and a service layer radio application (SLRA) for communication with a scheduler associated with a base station of the wireless network, the base station serving the cell; b) transferring transmission specific data in real time between the at least one latency critical application and the scheduler via the SLRA, wherein the SLRA is implemented on both the end user device and the scheduler; and c) optimizing allocation of resources in the cell by taking into account current status and operation requirements of the at least one latency critical application and/or optimizing current use of the resources in the cell by using the transmission specific data for adapting the at least one latency critical application in real time to current conditions on the cell.

BRIEF DESCRIPTION OF DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
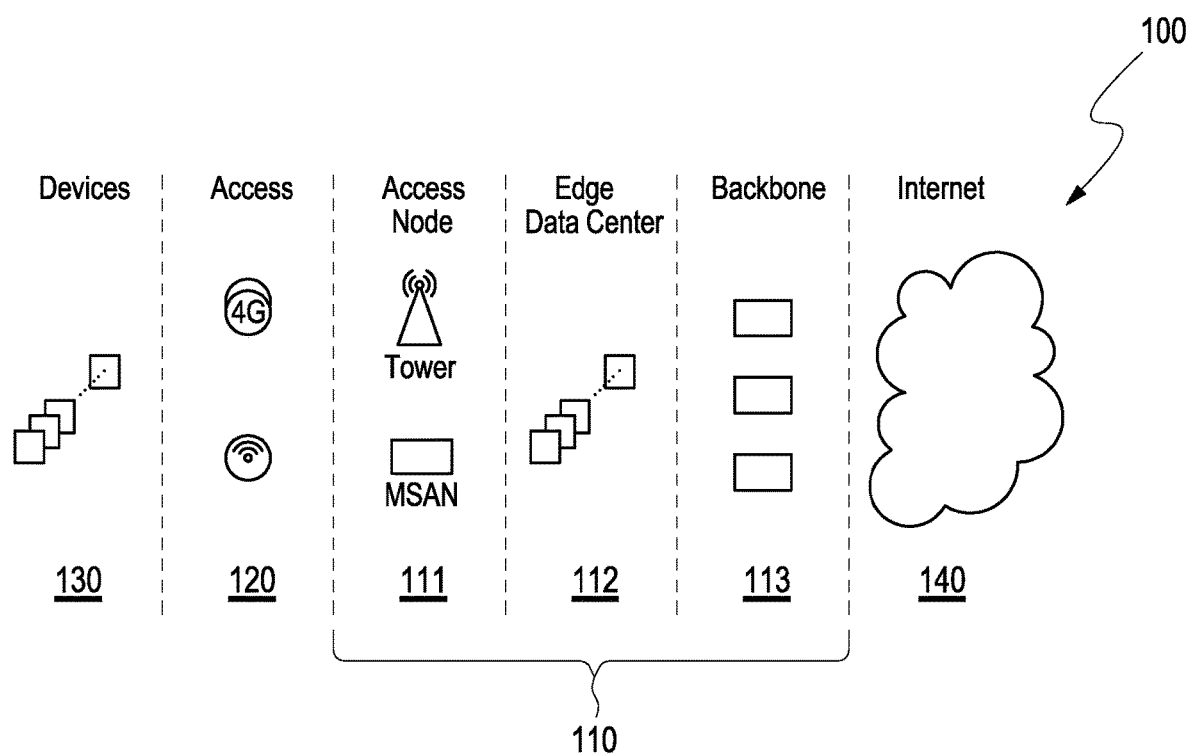
FIG. 1 is a schematic diagram illustrating an example system for provisioning of services/applications by a mobile network operator in accordance with an exemplary embodiment.

In an exemplary embodiment, a method is provided, the method comprising:
  a) provisioning, at an end user device which is located in a cell of a wireless network, at least one latency critical application and a service layer radio application (SLRA) for communication with a scheduler associated with a base station of the wireless network, the base station serving the cell;
  b) transferring transmission specific data in real time from the at least one latency critical application to the scheduler associated with the base station and/or vice versa from the scheduler to the at least one latency critical application via the SLRA which is implemented on both the end user device and the scheduler, and
  c) continuously optimizing allocation of resources in the cell by taking into account current status and operation requirements of the at least one latency critical application and/or continuously optimizing current use of the resources in the cell by using those transmission specific data for adapting the at least one latency critical application in real time to current conditions on the cell.

The SLRA can also be implemented on the base station and data received via the SLRA are internally forwarded to the scheduler.

Transmission is to be understood within the scope of the present disclosure in a broad sense, particularly as data transmission, i.e. as a transfer of data (a digital bitstream or a digitized analog signal) over a communication channel, wherein such channels can be copper wires, optical fibers, wireless communication channels, storage media and computer buses. In the present disclosure, particularly wireless communication channels are considered.

Data can be represented as electromagnetic signals, such as radio waves, microwaves, an electrical voltage or infrared signal. Data can be represented as packets, frames, bits, information considering all different communication layers.

Transmission specific data comprise, in the case that the transmission specific data are transferred from the at least one latency critical application to the scheduler, application specific data, such as, for example, data about a current operations status and operation requirements of the application (in the following also called context data), and in the case that the transmission specific data are transferred from the scheduler to the at least one latency critical application, data about current conditions on the cell, such as, for example, channel conditions, available resources, throughput, packet delay, queue length, etc.

"Continuously" means that changes concerning data transmission are observed in real time and whenever changes occur which have an impact on data transmission quality the allocation of resources and/or the current use of the resources is optimized regarding those changes.

According to an embodiment, step c) comprises:

d) receiving by the at least one latency critical application via the SLRA cell specific data from the scheduler of the base station and/or sending by the at least one latency critical application via the SLRA application specific data to the scheduler of the base station; and e) processing, by the scheduler associated with the base station, the application specific data received from the at least one latency critical application and allocating, by the scheduler, available transmission resources to the at least one latency critical application taking into account the application specific data and the current operation requirements of the at least one latency critical application, and/or f) processing the cell specific data received from the scheduler of the base station and adapting the at least one latency critical application to the current conditions on the cell taking into account the application specific data.

The at least one application is specified here as a latency critical application. However, exemplary embodiments of the method and system and computer readable storage medium can also be applied to near or no latency critical applications.

The scheduler being associated with the base station means that the scheduler can be co-located with the base station or it can be part of the base station or it can be located remotely from the base station for which it operates.

The decisive end-to-end latency is predominantly defined by the latencies within the radio path.

Generally, up to now schedulers are optimized to data throughput for all devices which are connected to the base stations housing the respective schedulers in order to acquire a high spectrum efficiency (Bit/s/Hz), such as using a proportional fair algorithm, thus, exhausting the limited and valuable resources at the best. However, generally, no differentiation is made between different types of use cases, such as Youtube videos which are buffered and latency critical applications. Both the Youtube videos and the latency critical applications have the same priority.

This results in a possibility that the latency for an application can extremely vary in dependence on the number of connected users, the signal quality, etc. Such variance can be recognized via different mean latencies subject to location and time, and also via a respective jitter.

Nowadays, latency critical applications, such as driver assistance systems with the exchange of surroundings models, remote rendering and streaming of AR (Artificial Reality) and VR (Virtual Reality) applications, VR360 applications, offloading of computer vision algorithms for drones, vehicles, robots, etc. underlie the normal scheduling. The occurring variance with respect to the mean latency and the jitter impede or even hinder the use of latency critical applications via the radio. Further, a static prioritization or static allocation of resources would reduce the spectrum efficiency and, thus, increase the costs for such latency critical applications.

According to an embodiment, a scheduler associated with the base station prioritizes and/or allocates the available resources to the at least one latency critical application in accordance with the present/current requirements of the at least one latency critical application.

Further, the at least one latency critical application determines in real time on the basis of a present operations status of the at least one latency critical application at least some of the following context data: separated for uplink and downlink: a currently required latency, a maximum required latency, a currently required minimum throughput, maximum error rate, priority, desired duration or number of desired transmissions of this configuration. These determined context data are then sent by the at least one latency critical application in real time via the SLRA to the scheduler associated with the base station.

According to a further embodiment, the scheduler associated with the base station dynamically and in real time takes into account the determined context data received from the at least one latency critical application hosted by the end user device when allocating, prioritizing and reserving the available resources (e.g. resource blocks) for the at least one latency critical application in order to achieve an efficient scheduling (spectrum efficiency with Bits/s/Hz) compared to a static reservation/constant prioritization/reservation of resources for the at least one latency critical application, and in parallel to fulfil the requirements of the at least one latency critical application.

In order to guarantee latencies or maximum latencies, resources have to be prioritized or blocked. In the case of a radio network those resources are resource blocks or resource elements. According to the present invention, the at least one latency critical application hosted by the end user device provides the base station, i.e. the scheduler in real time with context sensitive parameters about the at least one latency critical application, such as a current mean latency, the application needs at a present point in time, a maximum latency, a data rate the application needs at the present point in time and further parameters which are useful for the scheduler as a reference point for the current state of the at least one latency critical application. These parameters are provided besides other conventional used parameters such as channel condition, historical throughput, packet delay, queue length, etc.

First, the end user device which can be a smartphone or any other suitable terminal, provisions the at least one latency critical application. Due to the proximity of the end user device to the scheduler, information can be transmitted between the at least one latency critical application hosted by the end user device and the scheduler in real time. Thereby, the at least one latency critical application at the end user device is logically connected with the radio scheduler associated with the base station via the service layer radio application (SLRA). This enables the scheduler to receive context sensitive information/parameters about and from the at least one latency critical application via this service layer. The at least one latency critical application determines in real time dependent on its current status the mean latency needed at this current point in time, the maximum latency, the data rate needed at this current point in time and further status dependent parameters. The scheduler considers these context sensitive parameters when allocating the available resources: for example, the scheduler provides a higher maximum latency at a point in time t, a lower maximum latency at a point in time t+1, a low maximum latency with a lower data rate at a point in time t+2, a higher maximum latency with a higher data rate at a point in time t+N, etc.

Thus, only resources are prioritized or blocked at a specific point in time for the at least one latency critical application which are really required by the at least one latency critical application at this specific point in time. Thereby, an optimized usage of the spectrum of the radio frequencies is reached while the requirements of the at least one latency critical application are fulfilled.

Thus, for example, a vehicle driving with a low velocity (or in stillstand) can transmit periodically data such as a surroundings model with a higher maximum latency without compromising the driving safety. Conversely, the maximum latency should be reduced when the vehicle is driving with a higher velocity in order to adapt the reaction times within the global system accordingly and to guarantee the driving security.

Particularly, applications with a high data throughput are relevant for the adaptation of the data rate, such as video based applications: a remote rendering of an AR application requires the streaming of video data. Thereby, the data rate can be reduced or has to be increased as a function of the number of rendered objects, the size of the image area, the required resolution for the depth of detail, etc.

Due to the provision of the context sensitive parameters/requirements of the at least one latency critical application in real time with respect to maximum latency and data rate, the scheduler can dynamically optimize the distribution and allocation of the radio resources.

Thus, by the knowledge of the current requirements of the at least one latency critical application with regard to maximum latency and data rate (throughput), the scheduler gets more flexible when allocating and reserving the limited resources of the radio spectrum. Thus, the spectrum can be used/exploited more efficiently as by algorithms without knowledge of a current status of the at least one latency critical application. Such conventional algorithms do not at all take latency critical applications into account and new approaches as indicated below consider latency requirements only statically and with a lowest latency or with a mean latency which leads to the above mentioned disadvantages such as unsatisfactory and insufficient exploitation of the radio spectrum.

There are new approaches in the 5G standardization to provide a class of applications with a defined quality of service (QoS), for example via network slicing and/or URLLC (Ultra Reliable Low Latency Communication). Network slicing allows a network operator to provide dedicated virtual networks with functionality specific to a service over a common network infrastructure. Network slicing is a form of virtual network architecture and allows multiple virtual networks to be created on top of a common shared physical infrastructure. The virtual networks are then customized to meet specific needs of applications.

However, all these approaches are based on the assumption of static/unchanging latency and data throughput for a specific application. Thus, the allocation of resources to any application is also static, resulting in an inefficient utilization of resources, particularly in case of critical cell conditions, such as a full cell, bad signal conditions, end user device which is to be provided with a latency critical application being situated at the edge of the cell, etc. Due to the assumption of static latency and throughput for a specific application, non-latency critical applications are supplied, particularly in case of critical cell conditions, worse with resources according to those approaches compared to the method described herein.

According to a further embodiment, the scheduler associated with the base station determines in real time available resources for the at least one latency critical application as a function of a current status of the cell served by the base station, taking into account all connected devices with their applications, latency critical and/or non-latency critical applications, and their requirements and the overall available resources in the cell, derives therefrom a currently attainable individual data throughput and/or a currently attainable individual latency and/or a current individual packet loss for the at least one latency critical application, and sends the currently attainable individual data throughput and/or the currently attainable individual latency and/or the current individual packet loss to the at least one latency critical application via the SLRA and the at least one latency critical application adapts in real time accordingly.

The application adapts to the present status of the base station by adopting itself an appropriate operations status in real time. In that case it is possible that the transmission specific data are only transferred/sent in one direction, namely from the scheduler to the at least one latency critical application.

So far, an application only gets implicitly to know about a change of scheduling. Due to a new allocation of resources at the wireless/radio interface, the throughput for an application, for example, can be reduced instantaneously without providing the application with a possibility to adapt itself accordingly. Instead, packets can be queued/buffered or even discarded. This leads to undesired effects within the application and may require repetitions. When using TCP (Transmission Control Protocol), the data rate which is sent is in the medium term adapted to the new transport conditions. All this leads to jitter and to undesired effects or errors of the respective application.

Instead of an indirect tuning of the application, the provided method enables the at least one latency critical application to adapt in real time to a current status of a radio cell which is served by the base station. The at least one latency critical application is running near the base station at the end user device. Thus, the scheduler within the base station can transmit in real time status information about the radio cell to the at least one latency critical application hosted by the end user device. Such status information is transmitted via the service layer radio application (SLRA) which logically connects the base station/the scheduler with the end user device and, thereby, with the at least one latency critical application. The scheduler determines in real time the resources which are available for the at least one latency critical application in terms of resource blocks or resource elements. Therefrom, the possible latency and the data rate on the radio for the at least one latency critical application are derivable. Further parameters, such as packet loss, etc., can be determined. The status data "new latency", "new data rate", "packet loss", etc. are transmitted via SLRA in real time to the end user device and transferred to the at least one latency critical application. The at least one latency critical application can adapt now to the new status information and can capture a new appropriate operations status.

Thus, an autonomous vehicle can reduce its velocity when the latency guaranteed by the base station, i.e. the scheduler is currently increased. Conversely, the vehicle can increase its velocity as soon as the latency is reduced.

With remote rendering a higher compression rate with more image/compression artifacts can be used in order to adapt to a new data rate.

With computer games with a central game server, mechanisms such as interpolation and extrapolation can be reactivated with higher latencies with which higher latencies can be equalized, but which can also lead to errors.

Due to the ideal co-working of scheduler, end user device and the at least one latency critical application in real time, the best possible operations status of the at least one latency critical application which can be currently reached can be realized.

A continuous over-tuning of the application which can appear with the above mentioned indirect adaption mechanisms (according to the state of the art) leading to an uncontrollable behavior of the application can be avoided.

According to a further embodiment, the method further comprises the step of:
  determining, for the at least one latency critical application, different possible operating points with accordingly different quality stages;
  controlledly taking up in real time one of the possible operating points in accordance with a current status of the cell served by the base station concerning required resources for all connected devices.

In a further embodiment each of the possible operating points of the at least one latency critical application is assigned a priority and defined by at least one of the following parameters: minimum throughput downlink, minimum throughput uplink, maximum throughput downlink, maximum latency uplink, maximum error rate, desired duration or number of desired transmissions of this configuration.

It is possible that the possible operating points for the at least one latency critical application, which are listed in a table of operating points, are sent in real time from the at least one latency critical application hosted by the end user device to the scheduler of the base station. The scheduler of the base station aggregates all possible operating points of all applications which are currently running via the base station, allocates the available resources accordingly, and sends a feedback message to the at least one latency critical application hosted by the end user device about the finally selected operating point for the at least one latency critical application.

After selection of one of the possible operating points, the scheduler provides the at least one latency critical application temporarily with specific resources, such as maximum latency, minimum throughput with a well-defined Quality of Service (QoS), i.e. a well-defined guarantee. That means that the at least one latency critical application may relay for a specific period of time that the properties of the data transmission correspond to those of the selected operating point. Such properties are guaranteed until a new operating point is selected, triggered by the scheduler and/or the at least one latency critical application according to exemplary embodiments described herein.

In order to guarantee specific properties for data transmission, the scheduler takes appropriate measures such as prioritization, reservation of resources, etc.

The scheduler and the at least one latency critical application are again logically connected via the service layer radio application.

According to the above-mentioned embodiment, the at least one latency critical application determines as a function of its present status different possible operating points, each representing an allowable solution for the at least one latency critical application. However, the different operating points are assigned different quality stages for the at least one latency critical application, for example via a "graceful degradation".

The different operating points are defined by at least some of the following requirement parameters:
  mean latency
  maximum latency
  data rate/throughput
  maximum error rate
  desired length of the operating point (in milliseconds)
  desired number of transmissions
  priority
  further possible parameters which describe the operation status of the application The possible operating points for the at least one application are defined beforehand by a developer. The aim of such determination of operating points is to perform a substitution of uncontrollable errors and states due to changed latency and throughput by a controlled reduced user experience. If an optimal operating point for the at least one latency critical application due to a full cell or other specific cell conditions is not realizable, the controlled adaption of a further allowed operating point is possible.

The decision process about the operating points which are to be taken up in specific scenarios can be subdivided into three stages:
  (a) the developer of the at least one latency critical application defines all possible operating points for the at least one latency critical application when developing the at least one latency critical application,
  (b) the at least one latency critical application decides itself which operating points are eligible in a specific scenario, i.e. in a specific current status of the at least one latency critical application. Thus, for each scenario there is a group of operating points from which one operating point can be selected,
  (c) the scheduler finally decides in real time and dynamically, which operating point of the group of operating points is selected dependent on the current status of the cell.

It is further possible that the at least one latency critical application is adapted to the current status of the cell by adapting/changing its internal parameters, such as compression rate, frames per second, etc., which leads to a controlled reduction of quality of the at least one latency critical application, such as compressions artifacts.

The following table gives an example how operating points can be defined for the at least one latency critical application:

| Operating Point No. | Throughput Downlink (Kbit/s) | Max. Latency Downlink (ms) | Throughput Uplink (Kbit/s) | Max. Latency Uplink (ms) | Priority | Description: |
|---|---|---|---|---|---|---|
| 1. | 10.000 | 10 | 5 | 10 | 1 | Optimal operating point for the application => Optimal User Experience |
| 2. | 7.000 | 10 | 5 | 10 | 2 | increased compression rate for streaming => QoS/user experience decrease due to compression artifacts |
| 3. | 10.000 | 20 | 5 | 10 | 3 | Increasing prediction for AR application (via extrapolation of the movement), in order to compensate higher latency => acceptance of more prediction errors |
| 4. | 5.000 | 30 | 5 | 20 | 4 | Further increasing of compression rate and prediction (Extrapolation, Interpolation) => acceptance of more prediction errors, QoS/user experience decrease due to still more compression artifacts |
| 5. | ... | ... | ... | ... | 6 | ... |
| 6. | ... | ... | ... | ... | 7 | ... |
| 7. | 1000 | 100 | 5 | 100 | 8 | Application at this location and this time no more usable => => informing the user in a controlled manner with suggestion of issues (change of location, etc.) |

The possible operating points are transferred together with their respective requirement parameters via the SLRA in real time to the scheduler.

The scheduler aggregates all requirements of all latency critical applications. Then, the scheduler determines the allocation of resources for all user equipment within the cell. Thereby, the scheduler takes into account:

The no latency critical applications within the cell,
The latency critical application within the cell,
Conventional input parameters such as channel condition, historical throughput, packet delay, queue length for each user equipment,
Requirement parameters originating from the defined operating points of the latency critical applications.

First, an allocation of resources to all connected devices (latency critical and no latency critical) with requirement parameters indicated with priority 1 of the operating points are examined for realization. Only in the case that a resource shortfall occurs, the alternatives of the further priorities of the operating points are considered until a successful resource allocation is found. Thereby, it is possible to put all latency critical applications equally in their next lower priority stage. Further, any kind of mixed method is possible. An optimization between no latency critical and latency critical applications is possible. When a successful resource allocation is identified the scheduler applies this resource allocation and provides a respective application in real time with a report about the finally selected operating point.

According to a further embodiment, the scheduler associated with the base station and the at least one latency critical application hosted by the end user device exchange iteratively information for negotiating a best adjustment of the at least one application to present data transmission conditions.

There are two possible alternatives for starting such iterative process.

According to a first alternative, the scheduler associated with the base station sends, as starting point of the negotiation, an initial configuration comprising at least a maximum latency and a data rate to the at least one latency critical application hosted by the end user device. Thereby, it is possible that the scheduler sends further parameters. Such initial configuration is to be understood as a suggestion on the basis of which further negotiation is to be pursued.

According to a second alternative, the at least one latency critical application hosted by the end user device sends, as starting point of the negotiation, an initial configuration comprising at least an operating point or a list of possible operating points for the at least one application as starting point of the negotiation to the scheduler associated with the base station. Such initial configuration is to be understood as a suggestion on the basis of which further negotiation is to be pursued.

When receiving the initial configuration the respective party, i.e. the scheduler associated with the base station or the at least one latency critical application hosted by the end user device, examines the initial configuration and accepts the initial configuration or transmits a proposal for changes to the respective other party, i.e. to the at least one latency critical application hosted by the end user device or to the base station, particularly to the scheduler associated with the base station. Particularly, the scheduler is often forced to perform iterations as the scheduler, which has to control and administrate a plurality of latency critical applications, has to determine the correct operation status, i.e., all of the plurality of latency critical applications have to be supported, i.e., supplied with resources at the best. As the allocation of resources has to consider all latency critical applications simultaneously, usually more cycles between scheduler and the at least one latency critical application provisioned by the end user device are necessary. This scenario requires a higher reliability of the real time connection (realized by the SLRA) between the scheduler and the at least one latency critical application hosted by the end user device because more than one communication processes can follow each other. This has an influence on the time the scheduler needs to determine an optimal allocation of the resources.

It is possible that real time events occur which lead to changes in the cell. Such changes can cause changing operation conditions for the at least one latency critical application. In case of such changes in the cell the scheduler associated with the base station covering the cell sends in real time an information about such changes and/or such changing operation conditions via SLRA to the at least one latency critical application hosted by the end user device. The at least one latency critical application decides about a new subset of operating points which can be adopted by the latency critical application in order to adapt to the changing operation conditions in the cell at best. The at least one latency critical application sends the scheduler a message via SLRA about the new subset of operating points and the scheduler selects one operating point of the new subset of operating points.

After selection of one of the possible operating points, the scheduler provides the at least one latency critical application temporarily with specific resources, such as maximum latency, minimum throughput with a well-defined Quality of Service (QoS), i.e. a well-defined guarantee. That means that the at least one latency critical application may relay for a specific period of time that the properties of the data transmission correspond to those of the selected operating point. Such properties are guaranteed until a new operating point is selected, triggered by the scheduler and/or the at least one latency critical application according to exemplary embodiments described herein.

In order to guarantee specific properties for data transmission, the scheduler takes appropriate measures such as prioritization, reservation of resources, etc.

Such exchange of transmission specific data between the scheduler and the at least one latency critical application happens in real time at each change in the cell and/or the at least one latency critical application.

Thus, a real time adaption of the parties concerned, such as scheduler/cell and/or application, is reached.

The above described communication between the scheduler and the at least one latency critical application which is directly realized between the scheduler associated with the base station and the at least one latency critical application hosted by/implemented on an end user device/a user equipment (UE), is advantageous within an uplink based communication.

The present disclosure also provides a system comprising at least an end user device which is located in a cell of a wireless network, the cell being served by a base station of the wireless network,
wherein the end user device is configured to:
a) provision at least one latency critical application which is to be provided to at least one end user of the end user device in the cell via the base station serving the cell,
b) provision a service layer radio application for communication with a scheduler associated with the base station which serves the cell,
c) enable a transfer of transmission specific data in real time from the at least one latency critical application to the scheduler associated with the base station and/or vice versa from the scheduler to the at least one latency critical application via the service layer radio application (SLRA) which is implemented on both the end user device and the scheduler.

The system is configured to execute a method according to any one of the above described embodiments.

The wireless network is generally deployed and managed by a network provider.

The present disclosure further provides a non-transitory computer readable storage medium comprising instructions that when executed cause one or more processors of a mobile network to:
A) provision, at an end user device which is located in a cell of a wireless network, at least one latency critical application and a service layer radio application for communication with a scheduler associated with a base station of the wireless network, the base station serving the cell,
B) transfer transmission specific data in real time from the at least one latency critical application to the scheduler associated with the base station and/or vice versa from the scheduler to the at least one latency critical application via the service layer radio application (SLRA) which is implemented on both the end user device and the scheduler, and
C) continuously optimize allocation of resources in the cell by taking into account current status and operation requirements of the at least one latency critical application and/or continuously optimize current use of the resources in the cell by using those transmission specific data for adapting the at least one latency critical application in real time to current conditions on the cell.

The details of one or more exemplary embodiments are set forth in the accompanying drawings and the description below. Other features, objects, and advantages of the exemplary embodiments will be apparent from the description and drawings, and from the claims.

FIG. 1 is a schematic diagram illustrating an example system 100 according to an exemplary embodiment. The system 100 comprises a network 110 of a mobile network operator (MNO), an access layer 120 and end user devices 130 which can access the mobile network 110 via the access layer 120. Further the devices 130 can access the Internet 140 via the access layer 120 and the mobile network 110 and, thus, benefit from all services provided by or via the Internet 140.

The mobile network 110 comprises a plurality of access nodes 111, such as a MSAN (Multi-Service Access Node) and/or a cell tower (an antenna support with mobile antennas), a plurality of edge computing systems 112 and a backbone 113 interconnecting the mobile network 110 with the Internet 140.

A mobile network operator (MNO), also known as a wireless service provider, is a provider of wireless communications services that owns or controls all the elements necessary to sell and deliver services to an end user including radio spectrum allocation, wireless network infrastructure, back haul infrastructure, provisioning computer systems, etc.

In general, edge devices are normally routers that provide authenticated access (most commonly PPPoA and PPPoE) to faster, more efficient backbone and core networks. The edge computing systems 112 provided here are made smart, so that the edge computing systems 112 are not only routers, but can include Quality of Service (QoS) and multi-service functions to manage different types of traffic and provision applications, particularly latency critical application. Each of the plurality of edge computing systems 112 is located nearby at least one base station 111 and, thus, nearby a scheduler co-located or at least associated with the at least one respective base station 111. Due to the physical proximity of each of the edge computing systems 112 to at least one respective base station 111, information between the edge computing systems 112 and the respective neighboring base stations 111 can be transferred in real time. This enables the scheduler associated with a respective base station 111 to allocate in real time available resources to applications which are provisioned by the respective neighboring edge computing systems 112.

Considering a latency critical application which is to be provided to an end user device 130, the latency critical application can be directly hosted by the respective end user device 130 or it can be provisioned by a selected edge computing system 112 which is nearby the base station 111 serving the end user device 130. The scheduler associated with the base station 111 is provided in real time via the selected edge computing system 112 and/or the end user device 130 with application specific data/parameters when allocating resources to the latency critical application. Such application specific parameters are, for example, context sensitive parameters of the latency critical application, such as mean latency, maximum latency and data rate which are currently needed by the latency critical application. The scheduler is provided with further input parameters, such as "channel condition", "historical throughput", "packet delay", "queue length", i.e. with parameters reflecting a current status on/in the cell. As those parameters are provided in real time, the scheduler can consider dynamically requirements of the application which change with time. Thus, the scheduler only blocks resources which are necessary for fulfilling the current requirements of the application in real time. An optimal usage of the spectrum is reached while the latency requirements of the latency critical application are fulfilled at any time.

Figure 2:
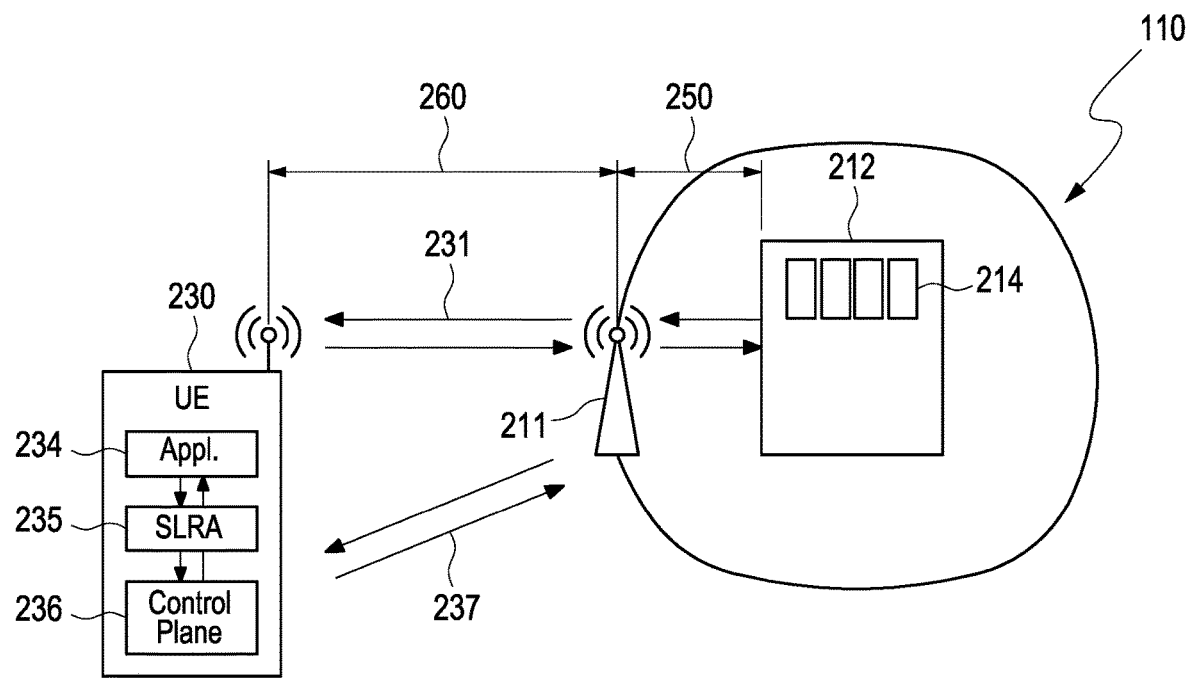
FIG. 2 is a detailed view of FIG. 1 illustrating schematically a data transfer between user equipment, base station and edge computing system in accordance with an exemplary embodiment.

FIG. 2 shows a detailed view of FIG. 1 illustrating schematically a data transfer between a user equipment 230 and a base station 211, and further a data transfer between the base station 211 and an edge computing system 212 which is located nearby the base station 211 in accordance with exemplary embodiments described herein. The user equipment 230 is currently served by the base station 211 because the user equipment 230 is currently positioned within a coverage area of a cell which is served, i.e. defined by the base station 211 as indicated by double arrow 260. Thus, data are transferred between the user equipment 230 and the base station 211 as indicated by double arrow 231. Applications which are desired by the user equipment 230 have to be supplied with resources (resource blocks/resource elements) via the base station 211. A scheduler associated with the base station 211 has to allocate available resources to all applications and services which are running via the base station 211. In the case that the user equipment 230 is to be provided, for example on demand, with a latency critical application, the latency critical application can be directly implemented on the end user device 230 as client-based application indicated by reference number 234 or it can be hosted as server-based application 214 by a selected edge computing system 212 that is located most nearby the base station 211, as indicated by double arrow 250, for that the selected edge computing system 212 provisions the latency critical application 214. In the following, the latency critical application 234 which is implemented on the end user device 230 is considered. The end user device 230 comprises further a service layer radio application (SLRA) 235 and a control plane 236 and/or a user plane.

The end user device 230 is logically connected, as indicated by double arrow 237, with the scheduler of the base station 211 via the service layer radio application 235. Via the service layer radio application 235, the scheduler receives in real time context sensitive parameters of the latency critical application 234, such as currently needed mean latency, currently needed maximum latency and currently needed data rate. Thus, the scheduler of the base station 211 can consider those context sensitive data when dynamically allocating resources to the latency critical application 234. Thus, the scheduler can allocate a higher maximum latency at a point in time t, a smaller maximum latency at a point in time t+1, a smaller maximum latency with a smaller data rate at a point in time t+2, a higher maximum latency with a higher data rate at a point in time t+N. Thus, only resources are blocked in real time for the latency critical application 234 which are really currently needed by the latency critical application 234. Therefore, at any time, an optimal usage of the spectrum is reached while latency requirements are simultaneously fulfilled. The base station 211 and the selected edge computing system 212 form part of the mobile network 110 of the mobile network operator, as indicated by circle 110.

Figure 3:
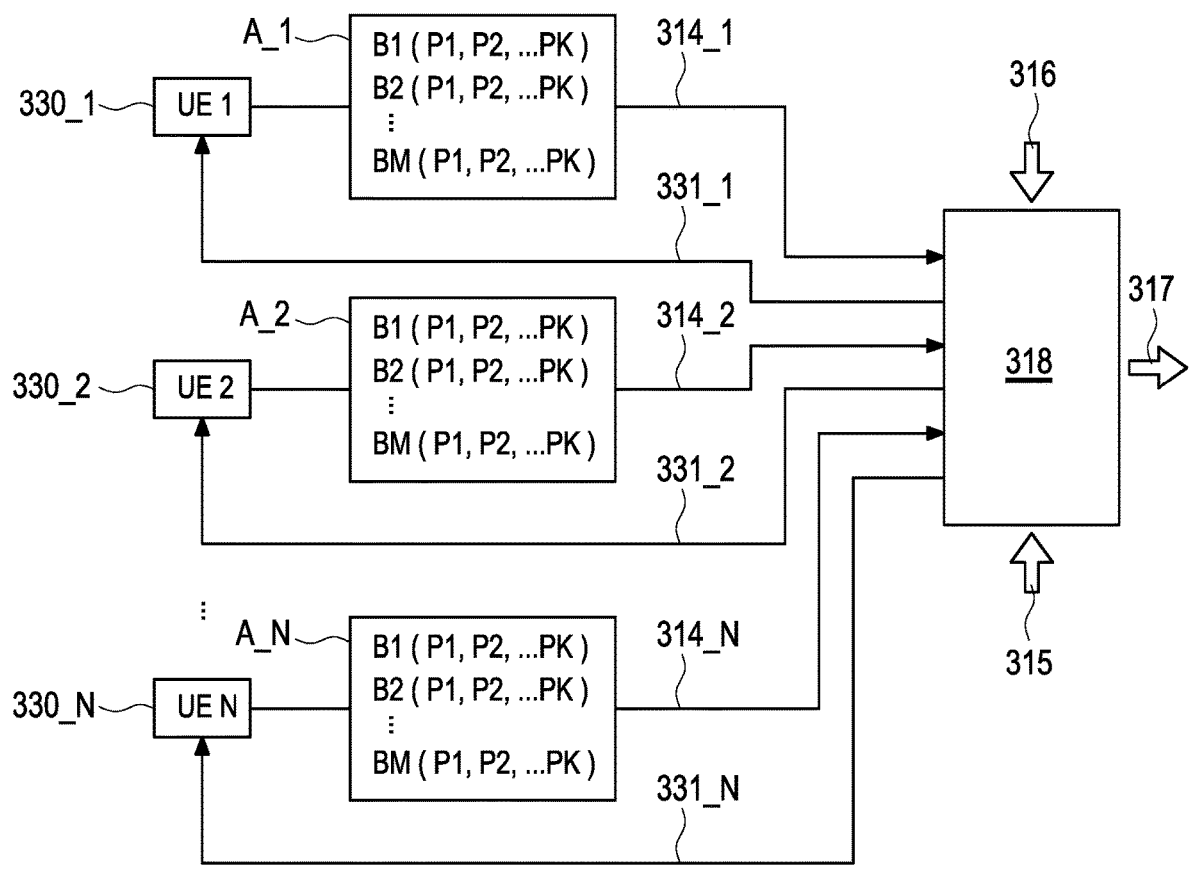
FIG. 3 shows schematically an allocation of resources to a plurality of latency critical applications in accordance with an exemplary embodiment.

FIG. 3 shows schematically an allocation of resources to a plurality of latency critical applications $A\_1, A\_2, \ldots, A\_N$ in accordance with exemplary embodiments described herein.

FIG. 3 shows a scheduler 318 as part of a base station. The scheduler 318 is configured to allocate dynamically available resources to all different applications $A\_1, A\_2, \ldots, A\_N$ running via the base station. Each of those different applications $A\_1, A\_2, \ldots, A\_N$ is provided for a user UE1, UE2, UEN via a respective end user device 330_1, 330_2, ... 330_N, particularly each for a respective different user. FIG. 3 shows a plurality of N different end user devices 330_1, 330_2, ... 330_N, each end user device 330_1, 330_2, ... 330_N provisions/hosts an application $A\_1, A\_2, \ldots, A\_N$. According to a possible embodiment, it is determined for each application $A\_1, A\_2, \ldots, A\_N$ different possible operating points $B1, B2, \ldots, BM$ with accordingly different quality stages. Further, it is possible, that the possible operating points $B1, B2, \ldots, BM$ differ from application to application. Each operating point $B1, B2, \ldots, BM$ is defined by a number of parameters $P1, P2, \ldots, PK$. For the sake of convenience, the operating points are designated for all applications identically by $B1, B2, \ldots, BM$. The same applies to the parameters which are designated for all applications identically by $P1, P2, \ldots, PK$. It is now possible, that each application is taking up in real time in a controlled manner one of the possible operating points in accordance with a present status of the base station, i.e. the cell served by the base station. Each of the numbers K, M, N is a positive integer.

Each of the possible operating points is assigned a priority and defined by at least one of the following parameters P1, P2, ..., PK: throughput downlink, throughput uplink, maximum latency downlink, maximum latency uplink.

The possible operating points B1, B2, ..., BM for the different applications A_1, A_2, ..., A_N are sent in real time from the different end user devices 330_1, 330_2, ..., 330_N, particularly from the different applications hosted by the different end user devices 330_1, 330_2, ..., 330_N as input parameters, as indicated by arrows 314_1, 314_2, ..., 314_N to the base station, i.e. to the scheduler 318. The scheduler 318 also receives classical input parameter 316, such as channel condition, historical throughput and packet delay and queue length and other input parameters 315. The scheduler 318 of the base station aggregates all possible operating points of all applications which are currently running via the base station, allocates the available resources accordingly and sends a feedback message to the respective end user devices 330_1, 330_2, ..., 330_N, particularly to the respective applications hosted by the respective end user devices about the finally selected operating point for each of the respective applications. Such feedback message is indicated by arrows 331_1, 331_2, ..., 331_N, respectively.

The scheduler 318 and the respective applications A_1, A_2, ..., A_N are again logically connected via the service layer radio application, respectively.

According to the above mentioned embodiment, each application determines as a function of its present status different possible operating points, which represent an allowable solution for the application, respectively. However, the different operating points are assigned different quality stages for the application, for example via a "graceful degradation".

The different operating points are defined by at least some of the following requirement parameter:
Mean latency
Maximum latency
Data rate/throughput
Maximum error rate
Desired length of the operating point (in milliseconds)
Priority
Further possible parameters which describe the operation status of the application The possible operating points B1, B2, ..., BM for each application A_1, A_2, ..., A_N are defined beforehand by a developer. The aim of such determination of operating points is to perform a substitution of uncontrollable errors and states due to changed latency and throughput by a controlled reduced user experience. In the case that an optimal operating point for a respective application, due to a full cell or other specific cell conditions, is not realizable, the controlled adaption of a further allowed operating point is possible.

The following table gives an example how the operating points B1, B2, ..., BM, exemplary M=7, can be defined for each application A_1, A_2, ..., A_N:

| Operating Point No. | Throughput Downlink (Kbit/s) | Max. Latency Downlink (ms) | Throughput Uplink (Kbit/s) | Max. Latency Uplink (ms) | Priority | Description: |
|---|---|---|---|---|---|---|
| B1 | 10.000 | 10 | 5 | 10 | 1 | Optimal operating point for the application => Optimal User Experience |
| B2 | 7.000 | 10 | 5 | 10 | 2 | increased compression rate for streaming => QoS/user experience decrease due to compression artifacts |
| B3 | 10.000 | 20 | 5 | 10 | 3 | Increasing prediction for AR application (via extrapolation of the movement), in order to compensate higher latency => acceptance of more prediction errors |
| B4 | 5.000 | 30 | 5 | 20 | 4 | Further increasing of compression rate and prediction (Extrapolation, Interpolation) => acceptance of more prediction errors, QoS/user experience decrease due to still more compression artifacts |
| B5 | ... | ... | ... | ... | 6 | ... |
| B6 | ... | ... | ... | ... | 7 | ... |
| B7 | 1000 | 100 | 5 | 100 | 8 | Application at this location and this time no more usable => => informing the user in a controlled manner with suggestion of issues (change of location, etc.) |

The possible operating points B1, B2, ..., BM are transferred together with their respective requirement parameters via the SLRA in real time to the scheduler 318.

The scheduler 318 aggregates all requirements of all latency critical applications. Then, the scheduler determines the allocation of resources for all user equipment/end user devices 330_1, 330_2, ..., 330_N within the cell, as indicated by arrow 317. Thereby, the scheduler 318 takes into account:

The no latency critical applications within the cell,
The latency critical application within the cell,
Conventional input parameters such as channel condition, historical throughput, packet delay, queue length for each user equipment,
Requirement parameters originating from the defined operating points of the latency critical applications.

First, an allocation of resources to all devices (latency critical and no latency critical) with requirement parameters indicated with priority 1 of the operating points B1, B2, ..., BM are examined for realization. Only in the case that a resource shortfall occurs, the alternatives of the further priorities of the operating points B1, B2, ..., BM are considered until a successful resource allocation 317 is found. Thereby, it is possible to put all latency critical applications equally in their next lower priority stage. Further, any kind of mixed method is possible. An optimization between no latency critical and latency critical applications is possible. When a successful resource allocation 317 is identified the scheduler 318 applies this resource allocation and provides a respective application in real time with a report about the finally selected operating point.

According to a further embodiment, the scheduler and the respective applications hosted by a respective end user device exchange iteratively information for negotiating a best adjustment of all applications to present data transmission conditions within the respective cell.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 system
110 wireless network
111 access node/base station
112 edge computing system
113 backbone
120 access layer
130 end user device/user equipment
140 Internet
211 base station
212 edge computing system
214 server-based application
230 end user device
231 double arrow
234 client-based application
235 service layer radio application
236 control plane
237 double arrow
250 double arrow
260 double arrow
315 further input parameters/data
316 classical input parameters/data
317 resource allocation
318 scheduler
314_1, 314_2, ..., 314_N arrows
331_1, 331_2, ..., 331_N arrows (feedback message)
A_1, A_2, ..., A_N applications
330_1, 330_2, ..., 330_N end user devices
B1, B2, ..., BM operating points
P1, P2, ..., PK parameters

The invention claimed is:

1. A method, comprising:
a) provisioning, at an end user device which is located in a cell of a wireless network, at least one latency critical application and a service layer radio application (SLRA) for communication with a scheduler associated with a base station of the wireless network, the base station serving the cell;
b) transferring transmission specific data in real time between the at least one latency critical application and the scheduler via the SLRA, wherein the SLRA is implemented on both the end user device and the scheduler; and
c) optimizing allocation of resources in the cell by taking into account current status and operation requirements of the at least one latency critical application and/or optimizing current use of the resources in the cell by using the transmission specific data for adapting the at least one latency critical application in real time to current conditions on the cell;
wherein the scheduler and the at least one latency critical application iteratively exchange information to negotiate an optimal adjustment of the at least one latency critical application to current data transmission conditions in terms of spectrum efficiency and fulfillment of the current operation requirements of the at least one latency critical application within possible operating points of the at least one latency critical application.

2. A method, comprising:
a) provisioning, at an end user device which is located in a cell of a wireless network, at least one latency critical application and a service layer radio application (SLRA) for communication with a scheduler associated with a base station of the wireless network, the base station serving the cell;

b) transferring transmission specific data in real time between the at least one latency critical application and the scheduler via the SLRA, wherein the SLRA is implemented on both the end user device and the scheduler; and c) optimizing allocation of resources in the cell by taking into account current status and operation requirements of the at least one latency critical application and/or optimizing current use of the resources in the cell by using the transmission specific data for adapting the at least one latency critical application in real time to current conditions on the cell;

wherein step c) comprises:

d) receiving, by the at least one latency critical application via the SLRA, cell specific data from the scheduler and/or sending, by the at least one latency critical application via the SLRA, application specific data to the scheduler;

wherein step c) further comprises:

e) processing, by the scheduler, the application specific data received from the at least one latency critical application and allocating, by the scheduler, available transmission resources to the at least one latency critical application taking into account the application specific data and the current operation requirements of the at least one latency critical application; and/or f) processing the cell specific data received from the scheduler and adapting the at least one latency critical application to the current conditions on the cell taking into account the application specific data and/or the cell specific data.

3. The method according to claim 1, wherein the at least one latency critical application determines in real time on the basis of its current status at least some of the following context data: separated for uplink and downlink: a currently required latency, a maximum required latency, a currently required minimum throughput, maximum error rate, priority, desired duration, or number of desired transmissions for data transfer, and sends in real time via the SLRA the determined context data to the scheduler associated with the base station.

4. The method according to claim 3, wherein the scheduler dynamically and in real time takes into account the determined context data received from the at least one latency critical application when prioritizing and allocating available resources for scheduling and in parallel for fulling the current operation requirements of the at least one latency critical application on the end user device according to real time status of the at least one latency critical application.

5. The method according to claim 1, wherein the scheduler determines in real time available resources for the at least one latency critical application as a function of a current status of the cell served by the base station, taking into account all connected devices with their latency critical and/or non-latency critical applications, their requirements, and overall available resources in the cell, derives therefrom a currently attainable individual data throughput and/or a currently attainable individual latency and/or a current individual packet loss for the at least one latency critical application, and sends the currently attainable individual data throughput and/or the currently attainable individual latency and/or the current individual packet loss to the at least one latency critical application, and the at least one latency critical application adapts in real time accordingly.

6. The method according to claim 5, wherein the at least one latency critical application adapts in real time to the current status of the cell served by the base station by adopting itself an appropriate operations status according to the transmitted currently attainable individual data throughput and/or the currently attainable individual latency and/or the current individual packet loss for the at least one latency critical application.

7. The method according to claim 5, wherein the scheduler associated with the base station dynamically and in real time takes into account context data received from the at least one latency critical application hosted by the end user device when allocating, prioritizing and reserving the available resources for the at least one latency critical application for scheduling and in parallel for fulfilling the current operation requirements of the at least one latency critical application.

8. The method according to claim 1, further comprising:

determining, for the at least one latency critical application, different possible operating points with accordingly different quality stages; and controlledly taking up in real time one of the possible operating points in accordance with a current status of the cell served by the base station concerning required resources for all connected devices.

9. The method according to claim 8, wherein each of the possible operating points for the at least one latency critical application is assigned a priority and defined by at least one of the following parameters: minimum throughput downlink, minimum throughput uplink, maximum latency downlink, maximum latency uplink, maximum error rate, desired duration, or number of desired transmissions for data transfer.

10. The method according to claim 8, wherein the possible operating points for the at least one latency critical application are listed in a table of operating points and are sent in real time from the at least one latency critical application to the scheduler, wherein the scheduler aggregates all possible operating points of all applications which are currently running via the base station, allocates available resources accordingly, and sends a feedback message to the at least one latency critical application about a finally selected operating point for the at least one latency critical application, and wherein the at least one latency critical application adapts in real time accordingly.

11. The method according to claim 1, wherein the scheduler sends, as a starting point of a negotiation, an initial configuration comprising at least a maximum latency and a data rate to the at least one latency critical application.

12. The method according to claim 1, wherein the at least one latency critical application sends, as a starting point of a negotiation, an initial configuration comprising at least an operating point or a list of possible operating points for the at least one latency critical application to the scheduler.

13. The method according to claim 1, wherein in case of real time changes in the cell the scheduler sends in real time information about such changes and/or such changing operation conditions via the SLRA to the at least one latency critical application, wherein the at least one latency critical application decides about a new subset of operating points which can be adopted by the at least one latency critical application in order to adapt to the changing operation conditions in the cell, and sends the scheduler a message via the SLRA about the new subset of operating points, and wherein the scheduler selects one operating point of the new subset of operating points.

14. An end user device, wherein the end user device is located in a cell of a wireless network, wherein the cell is served by a base station of the wireless network wherein the end user device comprises a processor and a non-transitory memory having processor-executable instructions stored thereon, wherein the processor-executable instructions, when executed by the processor, cause the end user device to:
- a) provision at least one latency critical application in the end user device which is to be provided to at least one end user of the end user device in the cell via the base station serving the cell;
- b) provision a service layer radio application (SLRA) for communication with a scheduler associated with the base station which serves the cell; and
- c) enable a transfer of transmission specific data in real time between the at least one latency critical application and the scheduler via the SLRA, wherein the SLRA is implemented on both the end user device and the scheduler;

wherein the at least one latency critical application provisioned in the end user device iteratively exchanges information with the scheduler to negotiate an optimal adjustment of the at least one latency critical application to current data transmission conditions in terms of spectrum efficiency and fulfillment of current operation requirements of the at least one latency critical application within possible operating points of the at least one latency critical application.

15. A non-transitory computer-readable storage medium having instructions stored thereon, wherein the instructions, when executed, cause one or more processors to perform the following:
- A) provisioning, at an end user device which is located in a cell of a wireless network, at least one latency critical application and a service layer radio application (SLRA) for communication with a base station serving the cell;
- B) transferring transmission specific data in real time between the at least one latency critical application and a scheduler associated with the base station via the SLRA, wherein the SLRA is implemented on both the end user device and the scheduler; and
- C) optimizing allocation of resources in the cell by taking into account current status and operation requirements of the at least one latency critical application and/or optimizing current use of the resources in the cell by using the transmission specific data for adapting the at least one latency critical application in real time to current conditions on the cell;

wherein the scheduler and the at least one latency critical application iteratively exchange information to negotiate an optimal adjustment of the at least one latency critical application to current data transmission conditions in terms of spectrum efficiency and fulfillment of the current operation requirements of the at least one latency critical application within possible operating points of the at least one latency critical application.

\* \* \* \* \*